Figure 1:
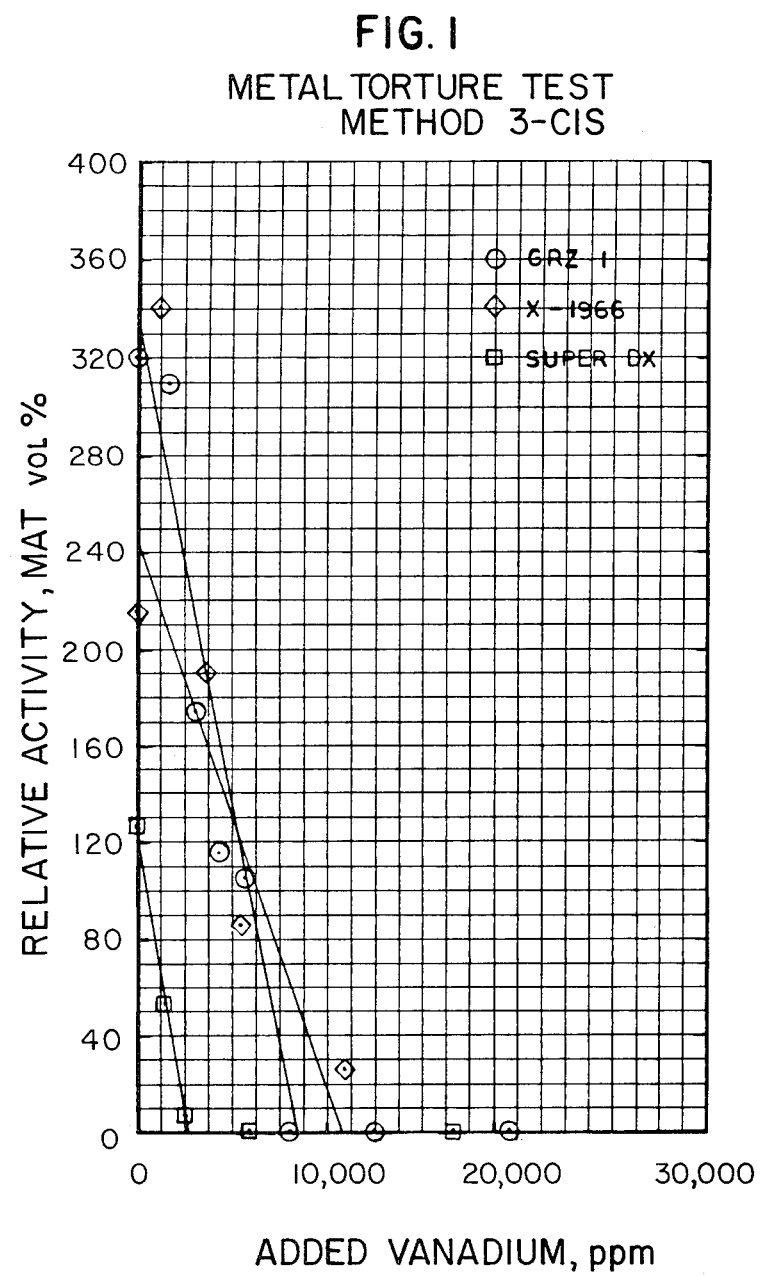

United States Patent [19]

Hettinger, Jr. et al.

[11] 4,440,868

[45] Apr. 3, 1984

[54] CARBO-METALLIC OIL CONVERSION CATALYSTS

[75] Inventors: William P. Hettinger, Jr.; Hubert W. Beck, both of Russell; Stephen M. Kovach, Ashland, all of Ky.

[73] Assignee: Ashland Oil, Inc., Ashland, Ky.

[21] Appl. No.: 328,354

[22] Filed: Dec. 7, 1981

[51] Int. Cl.³ .............................................. B01J 29/06
[52] U.S. Cl. ........................................ 502/65; 502/73
[58] Field of Search ..................................... 252/455 Z

[56] References Cited

U.S. PATENT DOCUMENTS

| | | | |
|---|---|---|---|
| 3,436,357 | 4/1969 | Plank et al. | 252/455 Z |
| 3,676,368 | 7/1972 | Scherzer et al. | 252/455 Z |
| 3,823,092 | 7/1974 | Gladrow | 252/455 Z |
| 3,835,032 | 9/1974 | Dolbear et al. | 252/455 Z |
| 3,867,310 | 2/1975 | Elliott, Jr. et al. | 252/455 Z |
| 4,079,019 | 3/1978 | Scherzer et al. | 252/455 Z |
| 4,144,194 | 3/1979 | Guidry | 252/455 Z |

Primary Examiner—Carl F. Dees
Attorney, Agent, or Firm—Richard C. Willson, Jr.; Carl D. Farnsworth

[57] ABSTRACT

A select group of hydrocarbon conversion catalysts suitable for converting carbo-metallic oil containing hydrocarbons to lower boiling transportation fuels are characterized and their method of preparation described. The select catalysts of this invention contain at least one zeolite in high concentration and said zeolite possessing a high silica-alumina ratio and a high lanthanum exchange content dispersed in a matrix possessing high pore volume and large pore size. In addition, the matrix material of large pore size and high pore volume is prepared to provide some acidic cracking activity and contains select metals as the oxide for the immobilization of vanadium and/or select materials for the trapping of deposited metals (Ni, V, Fe, Na) to counteract the detrimental effects of these metals in the regenerator section.

12 Claims, 6 Drawing Figures

METAL TORTURE TEST
METHOD 3-CIS

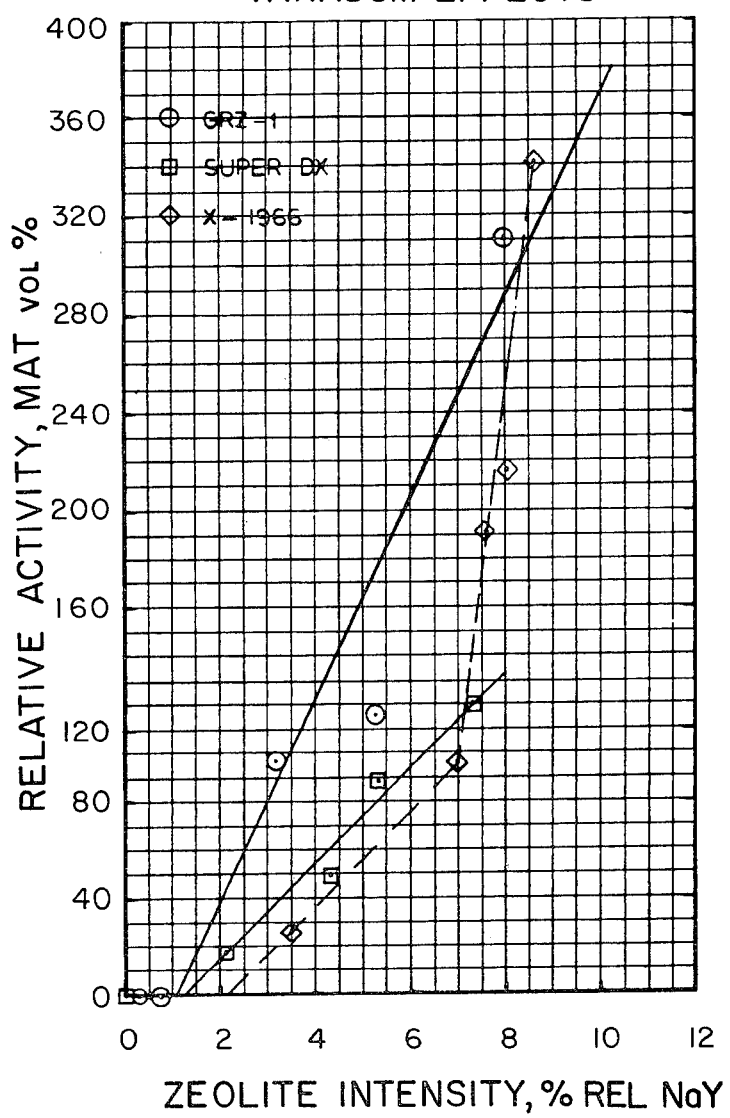

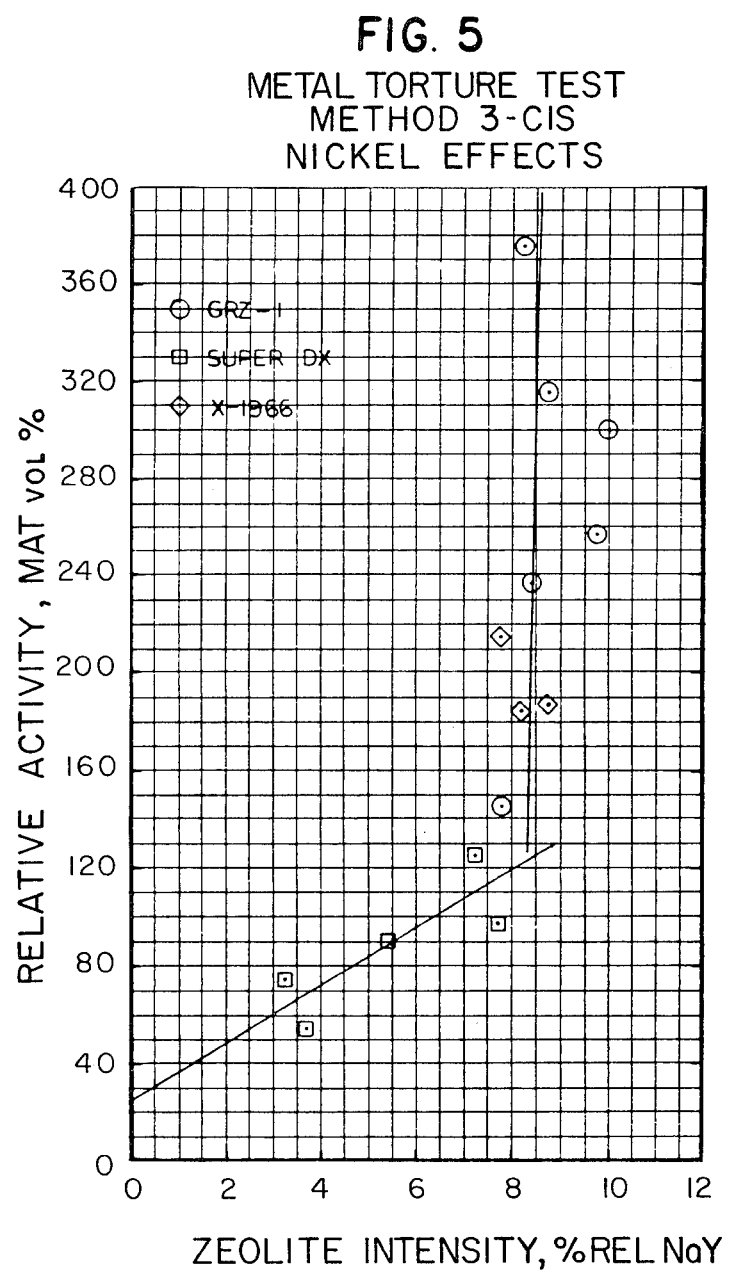

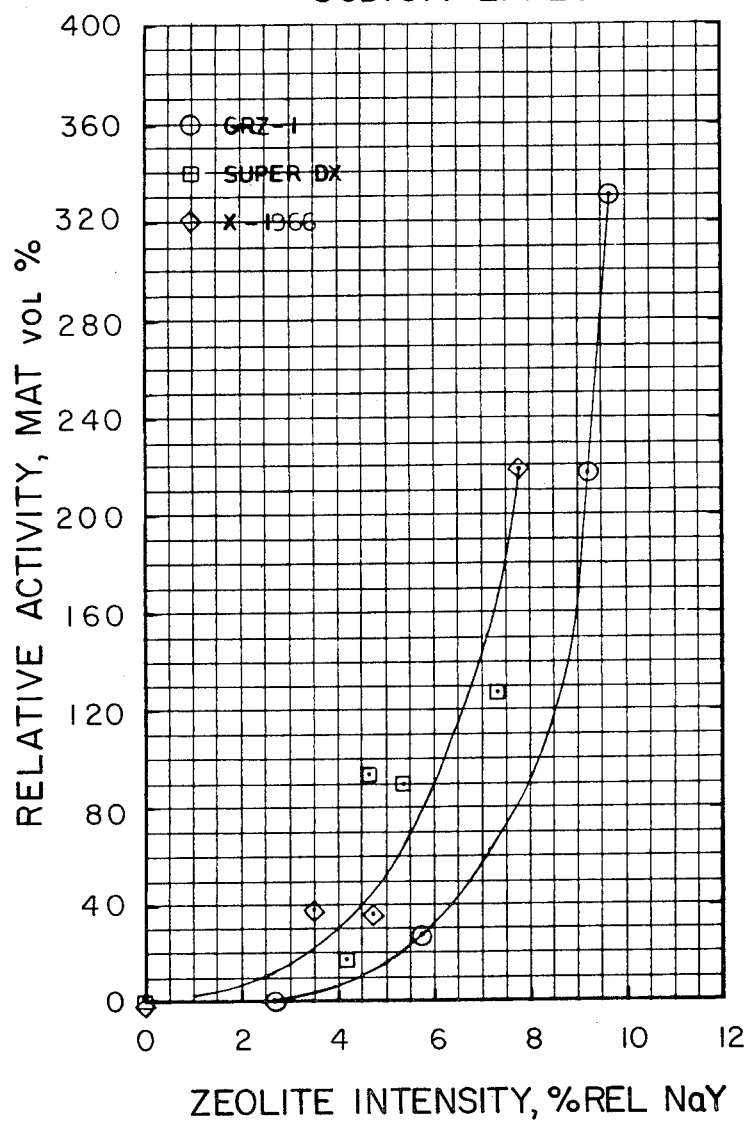

CARBO-METALLIC OIL CONVERSION CATALYSTS

This invention is concerned with characterizing a select group of hydrocarbon conversion catalysts suitable for converting carbo-metallic oil containing hydrocarbons such as reduced crudes, residual oils, topped crudes and high boiling hydrocarbons such as vacuum gas oils boiling above about 650° F. and comprising residue material boiling in excess of 1025° F. to low boiling transportation fuels. The select group of catalysts of this invention and method of preparation possess a high concentration of at least one select high activity crystalline zeolite of high lanthanum exchange content for stability dispersed in a matrix of high pore volume of at least 0.35 cc/gm. and pore size to particularly implement liquid and gasiform material diffusion contact with the catalyst particle. A high pore volume and relatively large pore size matrix material complex is provided with and/or without acidic cracking activity but preferably prepared to provide at least some acidic cracking activity for catalytic cracking of some deposited liquid components of the high boiling feed. More particularly the matrix material of large pore size and high pore volume promotes the accumulation and passivation of metals deposited by the high boiling feed and particularly contains also alumina, titania, zirconia and sacrificial sieves for the immobilization or trapping of deposited vanadia at temperatures encountered in a hydrocarbon conversion process such as the regeneration section thereof.

BACKGROUND OF THE INVENTION

The catalysts utilized in conventional gas oil fluid catalytic cracking (FCC) operations are tailored and prepared with less than 20 wt % zeolite for use other than in high carbon and metals depositions reduced crude cracking operations. The fact that these known catalysts may be used to crack residual oils and reduced crudes in a marginal short time operation does not mean they are economically suitable for processing liquid carbo-metallic oil contributing materials such as asphaltenes, polynuclear aromatics, polar molecules, naphthenes and porphyrins found in the residue of vacuum distillation and boiling above 1025° F. or more usually above 1050° F. Generally, a conventional gas oil FCC system employs a catalyst of relatively low crystalline zeolite content less than 20 wt % (10-15 wt %) which has a relatively low hydrothermal stability due to a low silica to alumina ratio zeolite; comprises a high cerium to lanthanum ratio exchanged crystalline zeolite dispersed in a matrix material of low pore volume usually not above about 0.22 cc/gm; and comprises a pore size opening of less than 500 angstroms. Generally, the matrix is merely a binder material of little or no acidic cracking activity.

The processing of gas oils (atmospheric and vacuum) and boiling below about 1025° F. with crystalline zeolites containing cracking catalysts has been available to the petroleum refiner since the early 60's and used considerably in the 70's. Generally such gas oil feeds are relatively low in metal contaminants and Conradson carbon value because of the feed purity sources selected. In addition, high sulfur or sour crudes and those comprising high levels of metal contaminants were not used in FCC operation in the absence of severe treating processes to remove or substantially reduce these undesired components. Such processes include hydrogenation, propane deasphalting, coking, hydrocracking, visbreaking and vacuum distillation. These processes are expensive and considerably reduce the volume of the crude oil upgraded to transportation fuels.

The catalysts developed for gas oil FCC processing have been developed to provide a high conversion and high selectivity to particularly gasoline boiling range products and light cycle oils since higher boiling product material is normally recycled to the cracking operation. In this gas oil processing environment, the deposition of metals is relatively low because of feed composition as well as the Conradson carbon level being generally below about 1 wt % and more usually such carbon deposition is within the range of 0.1–0.2 wt %. The feeds used in such gas oil operations are readily vaporized at the cracking reaction conditions and thus deposition of large amounts of liquids on the catalyst is minimized if not avoided. In FCC gas oil cracking operations, diffusion of the gas oil feed in the fluid particle size catalyst is not a major problem and pore blockage by excessive metal deposition by high boiling liquid hydrocarbons and by high coke deposition is not encountered as a major problem in the operating environment. Since deposition of undesired metal components and carbon is normally of a low order of magnitude there has been less need to provide a matrix material particularly designed or tailored to accumulate metal to the exclusion of substantially disturbing the catalyst cracking activity. Furthermore, and much more importantly, there has been no recognition by others of the need to particularly immobilize vanadia (vanadium pentoxide) because the level of depositon of vanadia encountered in gas oil cracking did not trigger recognition of particle sintering and coalescence due to liquefaction of this material at regeneration temperature conditions in the range of 1200° to 1600° F.

In contrast to the gas oil FCC operation as it is now known today, a reduced crude conversion operation processing much poorer quality feeds which have not been subjected to vacuum distillation, propane deasphalting and other contaminant removal processes as by hydrogenation, contain high levels of metal contaminants, sulfur and nitrogen compounds and a high Conradson carbon value. This high boiling dirty feed which we have chosen to define as carbo-metallic feed, composition characterization is particularly representative by much of the very poor qualtity feeds available to the refiner today.

The use of a conventional low zeolite content, less than 20 wt % zeolite containing FCC conversion catalyst as known today in a reduced crude conversion process leads to rapid catalyst deactivation by metals and high carbon deposits which can be corrected only by using very high catalyst replacement rates contributing to a highly unattractive economic operation. The rapid deactivation of the low zeolite containing catalyst is due to a rapid loss in zeolite activity and selectivity by metals deposition and relatively low hydrothermal stability for handling high levels of carbon deposition during regeneration thereof. Our studies have shown that high temperature regeneration in the presence of steam and especially vanadium and oxygen, rapidly destroys the activity of the zeolite cracking component of the catalyst and this condition is aggravated by using low silica-alumina ratio, higher sodium containing zeolites in conjunction with high metals deposition comprising vanadium, sodium, nickel and iron leading to rapid zeolite cracking activity neutralization. In addition the activity of the catalyst is affected by the large amount of heavy high boiling hydrocarbons in reduced crudes that are not vaporized and rapidly coat the catalyst particles with tacky liquid material also causing particle coalescence and agglomeration because of materials such as asphaltenes in the feed. Furthermore, the sorbed heavy hydrocarbons contribute to pore blockage, both in the matrix, and especially zeolite pores, and aggravate diffusion problems because of low pore volume, and effect acid site neutralization by adsorption of basic nitrogen compounds in the high boiling reduced crude feed.

The problems above reported with respect to cracking activity, acidity, hydrothermal stability, diffusion and pore blockage, sodium content of the zeolite, acid site neutralization, metals accumulation and vanadia immobilization are reduced or circumvented in substantial measure by employing the special catalyst compositions of the present invention for use in a Reduced Crude Conversion Process.

SUMMARY OF THE INVENTION

This invention is directed to the identification and characterization of an improved and novel class of catalyst compositions particularly suitable for converting high boiling hydrocarbons or heavy oil feeds recovered as atmospheric bottom of an atmospheric distillation tower and comprising asphaltenes, polynuclear aromatics, polars, naphthenes, porphyrins, nitrogen and sulfur compounds boiling above 1025° F. The present invention is concerned with the utilization of these unique catalysts, and identification of one or more unique methods for preparing a select group of catalyst compositions. The catalyst compositions thereof are particularly adapted and suitable for the conversion of one or more high boiling feeds herein identified and known by one or more terms such as a combination of heavy oils or materials in heavy oils comprising components boiling above 1050° F., as reduced crudes, topped crudes, residual oils, shale oils, oil products from coal liquefaction, tar sands oil products and resids all of which comprise some carbo-metallic oil components in the form of free metals, asphaltenes, refractory aromatic and polar compounds, naphthenes and porphyrins. The special catalysts of this invention are useful for processing Conradson carbon producing feed materials in the range of 2 to 10 Conradson carbon and comprising up to 75 ppm or more of vanadium. The catalyst compositions of this invention are particularly useful for processing high boiling feeds above identified when carrying an accumulated metals level of Ni+V in excess of 6000 ppm of which either nickel or vanadium is in a major proportion. In yet a further aspect, the present invention is concerned with providing an improved metals tolerant catalyst composition of high cracking activity whereby the catalyst particle service is extended and the catalyst inventory of the processing system is kept at a desired low level of magnitude contributing significantly to the economic efficiency of a reduced crude cracking operation. The provision for low catalyst inventories is desirable since it permits reducing the size of costly regeneration equipment, reduces the relative time the high vanadium containing catalyst is exposed to time and temperature in the regenerator relative to the time it is engaged in riser cracking. The longer the time that a high vanadium containing catalyst is at high temperature in the presence of steam and $O_2$ has been found to be very detrimental to catalyst life. Low catalyst inventories reduce catalyst makeup inventory for maintaining a predetermined and desired catalyst activity-selectivity characterization in a circulating catalyst system comprising hydrocarbon conversion to form desired products and regeneration of catalyst used in such an operation.

The high boiling reduced crude conversion operation contemplated by this invention relies upon a maintained catalyst inventory which will permit the use of catalyst to oil feed ratios in the range of 5–20 to 1 in a short contact time temperature restricted cracking zone such as attained in a riser cracking zone. Also of low or restricted inventory is an associated catalyst stripping zone and interconnecting catalyst transfer conduits in combination with a catalyst regeneration operation comprising at least two stages of catalyst regeneration in sequence to achieve the removal of deposited hydrocarbonaceous materials. Thus by providing a catalyst composition which will accept a greater metals accumulation at desired retained activity and selectivity thereby permitting a longer on stream operation with a higher activity-equilibrium metals level catalyst will greatly reduce catalyst replacement rate and thus improve the process operating efficiency.

The improved high activity metals tolerant catalysts of this invention are special microspherical particle compositions of fluidizable particulate size in the range of 20 to 200 microns size comprising a higher than normal percentage of high activity crystalline aluminosilicate of large pore size dimensions, ion exchanged to provide a lanthanum rich crystalline zeolite of low residual sodium, less than 0.25 wt % in the finished catalyst and preferably less than 0.1 wt % sodium oxide dispersed in a special matrix composition and comprising a clay which may provide some cracking activity with or without acidic modifiers dispersed in a silica or silica-alumina of gelaceous or colloidal ancestry. The catalyst is prepared under conditions to provide a pore volume greater than 0.22/cc/g and preferably at least about 0.32 cc/g. A catalyst particle with a pore volume of at least 0.4 cc/g is particularly desirable. The zeolite-clay mixture is prepared in combination with a binder material initially comprising one or more refractory metal oxides providing desired hardness in the final microspherical particle. The refractory metal oxide or oxides suitable for this purpose may be selected from the group consisting of silica, alumina, silica-alumina, silica-magnesia, silica-alumina-magnesia, silica-titania, silica-zirconia, titania, zirconia and mixtures and combinations thereof.

Zeolites or crystalline aluminosilicates (CAS) of acceptable pore dimensions and particle size suitable for the preparation of cracking catalyst composition usable according to this invention are micron size, three dimensional structures containing a large number of uniform openings or cavities interconnected by smaller, relatively uniform holes or channels.

Some zeolites which may be used with varying degrees of success include mordenite, gmelinite, zeolite "L", ZSM 4, faujasite and dealuminized faujasite of at least 5.5/1 silica to alumina ratio. A "Y" type crystalline faujasite is particularly preferred in preparing the catalyst of this invention. Some characteristics of these crystalline zeolite are as follows:

| Summary of Some Zeolite Pore Sizes | | | |
|---|---|---|---|
| | Pore Dimensions | Pore Free Area ($A^2$) | Si/Al Ratio |
| Faujasite | 7.4 × 7.4 | 55.0 | 2.8 |
| ZSM4 | 7.3 × 7.3 | 53.5 | 3.1 |
| "L" | 7.1 × 7.1 | 50.5 | 3.6 |
| Gmelinite | 7.0 × 7.0 | 49.0 | 2.5 |
| Mordenite | 6.7 × 7.0 | 46.8 | 6.0 |

The preferred zeolite for preparing the metals tolerant catalyst of this invention is in a particular embodiment a catalytically active faujasite crystalline zeolite providing a silica to alumina ratio greater than 5 and which has been ion exchanged several times before and after calcination to include rare earths and particularly provide a lanthanum to cerium ratio of at least 1/1 and preferably at least 1/1 and preferably 2/1:La/Ce or more. It is known that zeolite stability is directly proportional to the lanthanum or neodymium content and inversly proportional to the cerium content. Thus in commercial applications, some lanthanum rich exchange solutions have been used for zeolite exchange. The faujasite type zeolites known as "X" and "Y" crystalline zeolites are regularly shaped, discrete particles generally of a particle size in the range of 0.05 to 10 microns, preferably less than 5 microns when synthetically prepared and used in the catalyst preparation concepts of this invention. The especially preferred zeolite is the "Y" type crystalline zeolite, and the higher the silica to alumina ratio, the better its stability. Generally speaking, the preferred "Y" zeolite will contain a silica-alumina ratio of 4.5 or greater, more usually one containing 5/1 silica to alumina ratio and preferably at least 5.5 to 1 silica to alumina molar ratio.

The zeolites are catalytically activated and stabilized by ion exchange to replace sodium to a desired low level with hydrogen and/or rare earth metal to provide a final catalyst particle composition comprising less than 0.25 wt % sodium oxide. The removal of sodium ions to a very low level and provide a rare earth exchanged "Y" faujasite characterized as herein provided is much more stable than the hydrogen form of zeolite and this is particularly optimized by providing a high lanthanum content zeolite exchanged before and after calcination of a high silica content zeolite. In particular, when dealing with vanadia, a high lanthanum content crystalline zeolite of at least 7 wt % is especially desirable. These catalytically modified rare earth containing crystalline zeolites are highly active catalytic compositions and most usually require some further modification as by high temperature steaming and dilution in a support or matrix material to restrict the overall catalyst particles activity thereof within acceptable catalytic cracking limits.

In the prior art, catalyst compositions have been prepared so that the matrix comprises silica, alumina or mixtures thereof comprising at least 25 wt % alumina and more usually at least 50 wt % alumina. The matrix material is also known to comprise a clay in an amount of about 10 to 65 wt % of the finished catalyst. Clays such as kaolin, halloysite, montmorillonite and others have been used in the prior art. Also heat and chemically modified clays such as metakaolin and acid treated halloysite can be used. On the other hand, a colloidal dispersion of silica and/or alumina particles (10 to 10,000 A) may be added to a performed catalyst or catalyst gel to provide a catalyst composition of improved resistance to metal poisoning, as in U.S. Pat. No. 4,198,320. Furthermore U.S. Pat. No. 3,944,482 proposes cracking of a high metals content hydrocarbon feedstock in the presence of a catalyst comprising from 1 to 40 wt % of a zeolite dispersed in a refractory metal oxide matrix providing a pore size distribution in the range of 50-100 Angstroms. U.S. Pat. Nos. 3,972,835; 3,957,689 and 3,867,308 prepare catalysts by neutralizing silicates by adjusting their pH and then adding clay and zeolites to form cracking catalyst.

The improved metal tolerant catalysts of this invention are of a composition comprising at least 35 wt % and more usually about 40 wt % of a select lanthanum rich crystalline zeolite of small particle size in the range of about 0.05 to 5 microns particle size dispersed in a gel or colloidal suspension of silica, alumina or a combination thereof to form a matrix material providing desired intimacy of admixture with the small particles of the select crystalline zeolite herein identified. Preferably a kaolinite clay characterized by a small particle size of about 1 micron size, more or less and providing a pore volume in the catalyst particle complex in excess of 0.30 cc/g. It is preferred that the pore volume be at least 0.32 cc/g, greater than 0.35 cc/g and more desirably in the range of 0.4 to 0.8 cc/g.

In one particular aspect of this invention microspherical catalyst particles prepared by the technique of this invention are observed to include hollow shell particles some of which include at least one large major passageway to the interior of the particle shell. Thus the improved and novel catalyst composition of high lanthanum rich zeolite content provides a metals tolerant spherical catalyst particles composition prepared as herein provided which appear to be substantially less diffusion limited and thus remains effective catalytically even with high levels of metal contaminant for a much extended operating period over that heretofore experienced.

It will be recognized by those skilled in the art that the catalyst compositions of this invention are much more highly active catalytically than known prior compositions because of the high concentration of a select rare earth rich crystallinic zeolite composition of about 40 weight percent zeolite dispersed in a select matrix material preferably colloidal as herein identified and providing a high pore volume preferably greater than 0.30 cc/g. That is, a high percentage of a lanthanum rich rare earth exchanged high silica to alumina ratio CREY zeolite catalyst composition (calcined rare earth exchanged crystalline "Y" zeolite) of high hydrothermal stability is prepared and provided in a high pore volume select matrix material of colloidal ancestrary characterization. The catalyst composition comprises at least 40% of its pore openings being greater than 500 Angstroms, and at least 25% greater than 1000 Angstroms. This characterizaiton statistically provides a catalyst particle composition comprising at least 6% and preferably at least 7% rare earths for more available active cracking sites even in the presence of high metals loading for converting high CRC (Conradson carbon) precursor hydrocarbon feed materials in contact therewith. The use of microspherical catalyst compositions comprising colloidal matrix components and prepared as herein provided is operationally enhanced in the cracking or catalytic hydrocarbon conversion operation by selecting catalyst to oil ratios sufficiently high which will exclude filling more than ⅔ but at least ¼ to ⅓ of the catalyst particle pore volume with reactant oil feed material as herein identified.

The known literature and prior patent art, teach that metals, such as Ni, V, Fe, Cu and Na are deposited on a cracking catalyst when processing reduced crudes. Of all these metals, which effect catalyst activity and selectivity, only sodium was emphasized as affecting activity. The prior art however, also emphasizes that nickel and to some degree vanadium are especially harmful with regard to producing coke and hydrogen, and thus the metal contaminant level is expressed in terms of nickel expressed in terms of nickel equivalent. This is evident from one or more of the following equation:

$$Ni\ equivalents = 4Ni + V + Fe\ or$$

$$Ni\ equivalent = Ni \times V/4 \times Fe/5$$

In an investigation to identify catalyst compositions most suitable for converting reduced crudes in the presence of large amounts of metal, we have now identified vanadium and to a lesser degree, iron, as by far the most destructive of the metal contaminants, followed by sodium. Nickel appeared to be the least destructive. Vanadia, as vanadium pentoxide, causes irreversable destruction of the crystalline zeolite structure, rapidly producing a much lower activity material of or approaching amorphous nature. Sodium does lead to permanent neutralization of the zeolite acid cracking sites. Nickel leads primarily to temporary neutralization of the cracking sites by promoting dehydrogenation and deposition of carbonaceous materials.

Figure 2:
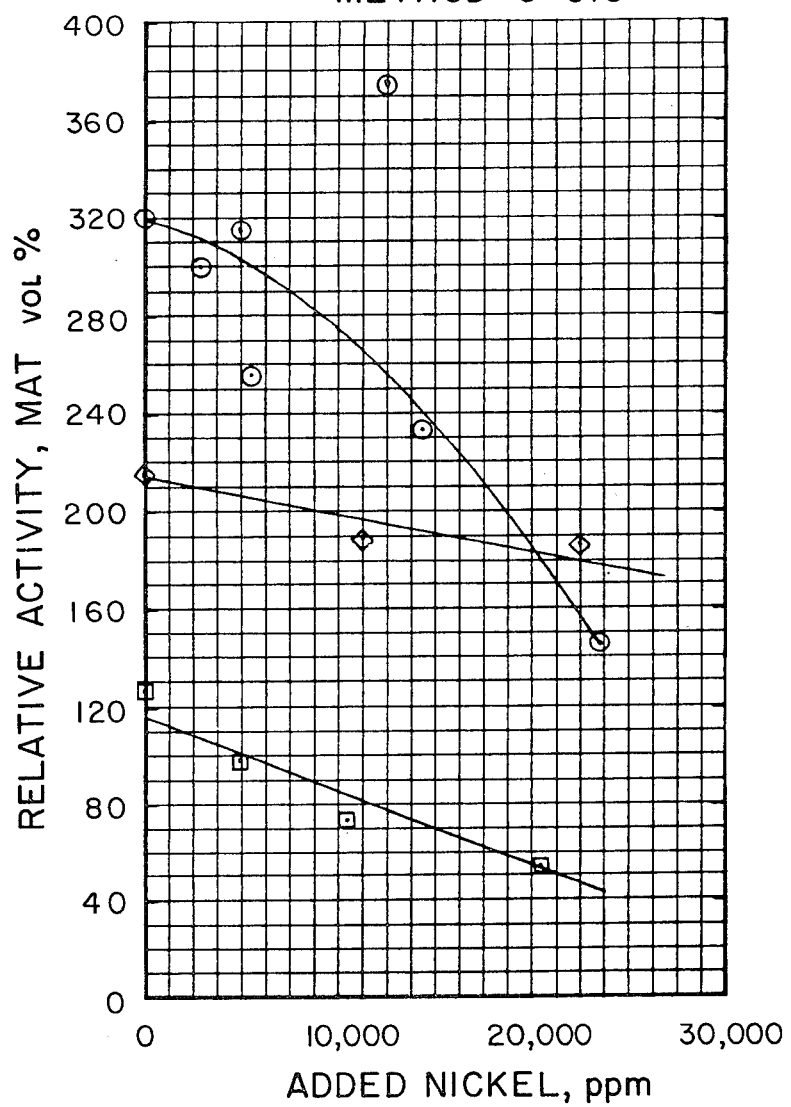
Figure 3:
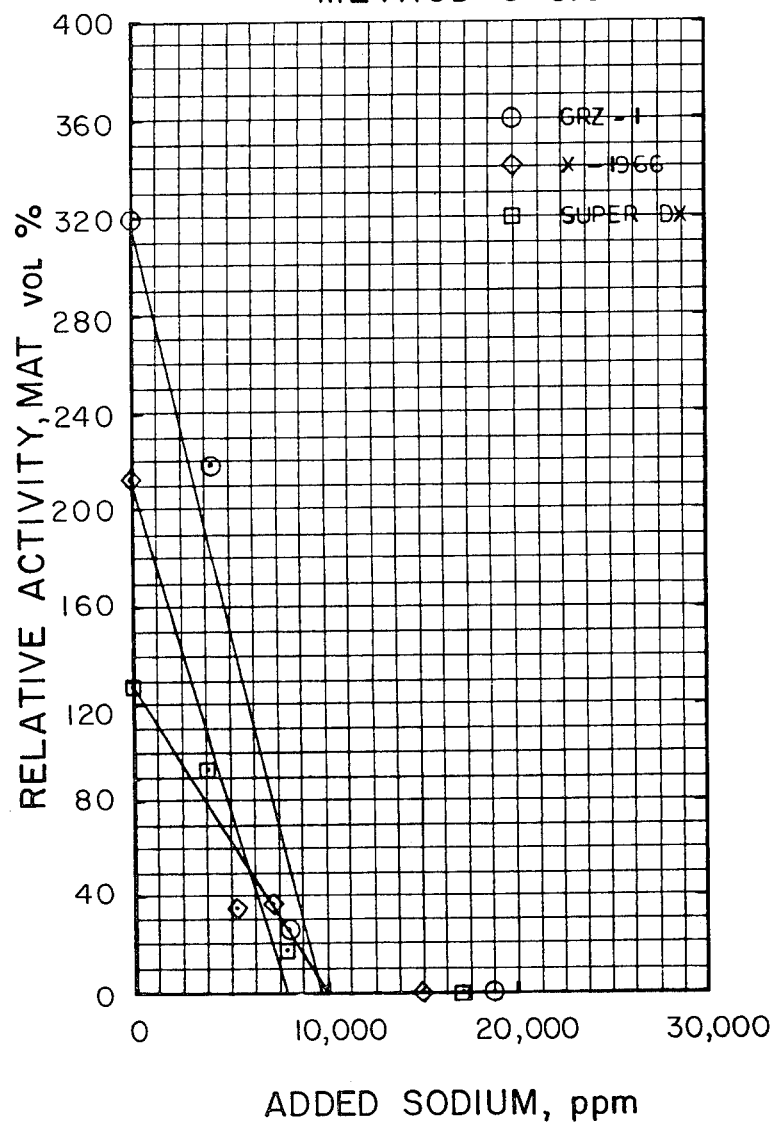

The effect of these metals on catalyst activity reported as relative activity - MAT volume %, is shown in FIGS. 1 through 6. The relationship between MAT conversion and relative activity is discussed in U.S. Pat. application Ser. No. 06-277-751; filed Mar. 30, 1981 and is incorporated herein by reference thereto.

In arriving at conclusion expressed herein, varying concentration of Ni, V and Na were utilized by impregnating several catalyst mixtures or compositions to study the effect of these metals on steamed equilibrium catalysts. The results obtained are reported below in Table A on the basis of 0.5 wt % metal reducing the relative activity of each catalyst mixture. That is, 0.5 wt % nickel reduces the conversion level 5–15%, 0.5 wt % vanadium reduces the conversion level 60–100% and 0.5 wt % sodium reduces the conversion level approximately 50–60%. This reduction is a percentage of the converison or a relative value.

TABLE A

| | % REDUCTION IN RELATIVE ACTIVITY | | | |
|---|---|---|---|---|
| | Super DX 10% Zeolite | GRZ-1 40% Zeolite | X-1966 25% Zeolite | Factor |
| 0.5% Ni | 15 | 7 | 5 | 9 |
| 0.5% V | 100 | 60 | 62 | 87 |
| 0.5% Na | 50 | 50 | 60 | 53 |

Equation #1: V equivalents = 9 V + 6 Na + Ni
Equation #2: V equivalents = V + 2/3 Na + Ni/9

Based on the above "V equivalent" equation in Equation #1 it is found that one can operate at varying metal levels in the feed which can go as high as 675 V equivalents in the feed when practicing the concepts of this invention or as high as 180,000 V equivalents on the catalyst. It is noted that in terms of catalyst destruction, nickel and vanadium reverse roles and sodium becomes important as against the selectivity emphasis expressed in the "Ni equivalents" equation of former patents and articles.

The catalyst compositions of this invention may be employed in a number of different apparatus arrangements known in the art or yet to be devised which permits low reactant residence time less than 3 seconds and more usually in the range of 0.5 to 2 seconds between a hydrocarbon feed, vaporous conversion products and catalyst particles at temperatures providing desired catalytic hydrocarbon cracking or conversion to more useful products. The product vapors are recovered at a temperature within the range of 950° to 1150° F. but more usually not above about 1100° F. In cooperation with the hydrocarbon conversion operation is a regeneration system or operation designed to restrict catalyst regeneration time and temperatures below 1500° F. and more usually below 1400° F. so as to produce a recoverable CO rich flue gas. The catalyst regeneration operation is designed to provide a regenerated catalyst of low residual carbon content and preferably less than 0.1 wt %. In a more particular aspect it is preferred employing at least two stages of temperature restricted catalyst regeneration operations in combination with one or more catalyst stripping operations which will operate in conjunction with one another to reduce the exothermic temperature rise encountered during the removal of relatively large deposits of hydrocarbonaceous materials and some metal contaminants contributed by cracking reduced crudes. More particularly a two stage oxygen containing gas regeneration operation is contemplated or one stage thereof may be replaced by using $CO_2$ to remove hydrocarbonaceous component material in combination with a relatively high temperature stripping operation to remove hydrogen, sulfur and nitrogen. In this catalyst regeneration operation and sequence of temperature restricted contact steps, it is contemplated in one particular embodiment of relying upon high temperature $CO_2$ to remove some hydrogen and some carbonaceous deposits in one or more stages and such an operation may be intercepted by oxygen combustion removal of a portion of the deposited carbonaceous material by burning to produce a CO or $C_2$ rich flue gas recovered from the operation. In any of these regeneration combinations it is particularly desirable to restrict the temperatures of oxygen combustion to relatively low levels, preferably below about 1450° F., which will provide recoverable CO rich or $CO_2$ rich flue gases. Removing hydrogen in hydrocarbonaceous deposits with $CO_2$ as well as carbon to produce recoverable CO improves measurably the overall heat balance of the combination operation and reduces potential temperature excursion changes to the catalyst under elevated temperature hydrothermal conditions.

DISCUSSION OF SPECIFIC EMBODIMENTS

The present invention particularly relates to the preparation and method of use of novel catalyst compositions particularly suitable for the conversion of high boiling hydrocarbons comprising carbo-metallic oil component of asphaltenes, naphthenes and porphyrins. More particularly, the present invention is directed to the characterization and preparation of a select novel class of high activity hydrocarbon conversion catalyst compositions suitable for use in converting high boiling hydrocarbons comprising components boiling above 1025° F.

The catalyst activity of a reduced crude cracking catalyst is provided and substantially maintained according to this invention by the merger of the following briefly identified features, namely:

(1) Cracking Activity—providing at least 35 wt.% of a rare earth exchanged before and after calcination of a "Y" faujasite crystalline aluminosilicate or crystalline zeolite to form a RECREY zeolite of high silica to alumina ratio at least equal to 4.5/1 and preferably greater than 5.5/1 silica-alumina molar ratio.

(2) Cracking Activity—preparing a final catalyst composition of low sodium content from low sodium ingredient material and comprising less than about 0.22 wt % sodium oxide and more preferably no more than about 0.15 wt % thereof.

(3) Hydrothermal Stability—improving the catalyst hydrothermal stability with a combination of rare earth exchanges to provide a high lanthanum to cerium ratio in excess of 1/1 in the catalyst composition and particularly the zeolite component thereof, and preferably greater than 3/1, and provide catalyst particle compositions comprising a rare earth oxide content of at least 6 wt % and preferably greater than 7 wt % rare earth oxides.

(4) Diffusion and Pore Blockage—employing a matrix material composition comprising one or more components of colloidal ancestry or convertable to colloidal suspensions. Preferably the matrix is of a composition providing a substantial portion of its pore size openings and comprising 40 or more percent thereof at least about 500 Angstroms and at least 25% greater than 1000 Angstroms or sufficient large pore size openings so that the highest molecular weight components of the feed will be adsorbed without causing undesired pore blockage; so that diffusion problems associated with the escape of cracked material is minimized; and so that the deposits of metals in the large pores also do not cause substantial pore blockage or diffusion problems. Thus it is contemplated employing different amounts of at least two different pore size providing colloidal suspensions of different particle size in forming the matrix composition of the catalyst particle composition of this invention. This variation in pore size openings as well as pore volume is used as a basis for varying particle porosity and attrition resistance properties of a spray dried microspherical catalyst particle composition. Thus, colloidal suspensions, no matter how obtained, of different size silica colloid or alumina colloid or a combination thereof may be employed with particular advantage to achieve a binder matrix material for the zeolite component of desired porosity and hardness.

(5) High Boiling Oil Component Absorption—the matrix material of the catalyst composition, whether acidic or neutral, is preferably of large pore volume greater than 0.30 cc/g and comprising substantial pore size openings of at least 500 Angstroms up to and including 1000 Angstroms so that the highest boiling components of a reduced crude feed not completely vaporized upon contact with freshly regenerated catalyst at temperatures up to 1450° F. can thermally and as well catalytically crack and the product of cracking enter the select zeolite pores for catalytic upgrading in preference to coating the catalyst particle surface and causing undesired particle agglomeration. It is also important to encourage condensation products of reduced crude cracking to deposit on the catalyst rather than parts of the apparatus employed and such deposition is particularly influenced by employing the catalyst to oil ratio herein defined in conjunction with the large pore size opening and pore volume defined. The catalyst compositions of this invention therefore are provided with a high pore volume preferably greater than 0.30 cc/g so that the total pore volume to liquid charge volume is at least 4/1 and used in a catalyst to oil ratio so that the liquid hydrocarbon material will fill no more than from ¼ to ⅔ of the pore volume. These restrictions with respect to pore volume and pore size opening used in conjunction with a particular catalyst to oil ratio above defined provide a significant departure in resultant condensation products from any known and described in the prior art.

(6) Matrix Material—the matrix material of the catalyst compositions of this invention is either relatively inert or active with respect to cracking activity. Preferably the matrix composition is an acidic acting material which will ensure that both thermal and catalytic cracking of absorbed and adsorbed high boiling hydrocarbon components is accomplished. Thermal conversion of high molecular components to form lower molecular weight component materials which may be further converted under more selective crystalline zeolite cracking conditions in a reaction zone is an important aspect in the utilization of the select lanthanum rich high zeolite content catalyst of this invention. Thus the combination of high pore volume - large pore size catalytically active matrix material is relied upon in substantial measure to thermally and catalytically convert high molecular weight high boiling metallo-porphyrins and asphaltenes or Conradson carbon precursors so that metal components thereof are deposited preferably on the matrix surface rather than on the select crystalline zeolite component of the catalyst. In addition, the matrix acidity is particularly desired to selectivity adsorb the basic heavy nitrogen compounds so that they also are restrained from entering the zeolite structure, whereby neutralizing the special zeolite cracking sites can be more desirably restrained over an extended period of use. The matrix material of this invention may be provided with added acidity by the addition of one or more materials such as sulfonates, phosphates, a halogen contributing material, phosphoric acid, boric acid, acid activated clay, silica-alumina, silica-titania, silica zirconia and other such acid contributing materials.

(7) Matrix and Metals Control—one of the important functions of the catalyst compositions of this invention is related to effecting a control on the metals deposited from cracking reduced crude containing portions of crude oils and comprising carbo-metallic components. As discussed herein, these carbo-metallic components comprising Conradson carbon contributors and deposited metals including particularly Ni, V, Fe and Na of which vanadium has been identified as contributing greater damage to the catalyst zeolite component than sodium, iron and nickel with sodium being the second most damaging. Thus the special matrix material or compositions comprising the catalyst composition of this invention and prepared from sodium materials, because of its provided pore volume and substantial pore size openings of at least 500 to 1000 Angstroms, entraps metals and accumulates them to a much higher order of magnitude heretofore not possible with much lower pore volume matrix containing catalyst of the order of about 0.22 cc/gm. This metal entrapment provision of the catalysts prepared according to this invention is made even more effective and novel by the employment of one or more vanadia immobilization materials which will complex therewith to form compositions which melt at a temperature above the temperature normally encountered in the catalyst regeneration operation in which employed. Thus the matrix material or composition contemplated by this invention prepared from a silica sol, gels and/or colloids of silica, alumina or a combination thereof as identified herein in admixture with a small particle of clay material or a second metals entrapment zeolite material identified herein ties up the deposited metals before they can reach and/or react with the special or select zeolite structure defined above to destroy it or cause catalyst particle coalescence and agglomeration as herein discussed. Materials suitable for acting as a metals accumulator and vanadia immobilization agent particularly includes an alumina material incorporated in the matrix, a pillared interlayered clay material and selected metal additives which complex with vanadia to form higher melting mixtures than encountered during regeneration such as identified in applicants copending application Ser. No. 06-277-752 filed Mar. 30, 1981, and Ser. No. 06-252-967; filed Apr. 10, 1981 and now abandoned, the subject matter of which is incorporated herein by reference thereto.

The select novel class of catalyst compositions identified by this invention serve a multiplicity of functions as herein identified when prepared to include the compositional parameters and components herein identified. The preparation of such catalytic materials also embodies or contemplates the inclusion of cheap filler and/or binder material as required, but more importantly a material which permits achievement of metals entrapment and enhancement of the desired pore size opening and volume structure in the manner above identified. Some materials suitable for this purpose include carbon black such as identified in applicants copending application PCT-US81-00492, filed Apr. 10, 1981, a high purity very fine kaolin clay, high purity alumina and certain ball clays. In this regard an acid leached montmorillonite, bentonite, or halloysite are also possible candidates and can also serve to provide acidity in the matrix as well as being used as a binder material.

In a typical commercial approach to the preparation of fluid cracking catalysts, a slurry of non-colloidal particles or a gel is normally prepared of the matrix materials and to this material is added a crystalline zeolite such as REY or CREY of Ce/La ratio≧1/1 (prepared outside of the slurry). A second approach is the preparation of the crystalline zeolite in situ—that is, utilizing the matrix materials and selected reaction conditions to generate the zeolite in situ, within the matrix material before spray drying. In these preparations, the most common salts utilized are in the sodium form because of their availability and low cost, e.g., Na silicate, Na aluminate, Na hydroxide. Thus relatively large amounts of sodium are always in the presence of the zeolite and also in the matrix materials.

U.S. Pat. No. 3,867,308 describes a process for preparing a cracking catalyst by preparing a hydrosol by rapid addition of mineral acid to sodium silicate, adjusting the pH of the sol, adding clay and a zeolitic component, spray drying, washing with water thereafter rare earth exchanging and recovering the product. In U.S. Pat. No. 3,957,689, an attrition resistant and high activity catalyst is prepared by binding clay and faujasite with a buffered silica hydrosol. Problems arising from the tendency of the sol to gel due to changes in pH during processing is minimized by buffering the sol in a desired pH range by the addition of a mixed sulfuric acid - aluminum sulfate solutions. The silica hydrosol is buffered in the pH range of 2 to 3.2. The buffered silica hydrosol contains between 1 and 10% alumina by weight of the solids. In a typical preparation, the silica hydrosol contains between 5 to 15% silica and 1 to 10% of the solids is alumina resulting from the addition of the buffering agent. The clay is present in an amount of about 10 to 65% by weight of the finished catalyst. The zeolite is added in an amount equal to 5 to 60% of the final catalyst with 5 to 30% being preferred. In the process of this patent, the faujasite is added to the buffered silica hydrosol as a slurry adjusted to a pH of 3 to 5 without any danger of the silica gel being precipitated at the interface of the particles of the faujasite or forming gel lumps. Thickening of the slurry above formed is said to occur at a pH above 3.5.

The most common crystalline zeolite utilized in catalyst preparation is a naturally occurring or a synthetic sodium "Y" faujasite, which upon a first series of exchange with a rare earth chloride (Ce/La~5/1) solution yields a lower sodium rare earth exchange zeolite called REY (Na=1-2%). A common catalyst preparation practice is to add this crystalline REY of relatively high sodium content to the slurry and then spray dry (a form of calcination) to form catalyst particles. The sodium content of the REY in the spray dried catalyst particles is lowered by water wash and treated with a rare earth salt solution to lower the sodium content of the particles to a range of about 1-2% Na down to 0.7-1.2 wt % Na in the CREY component of the catalyst. This type of catalyst preparation (REY-spray drying-RE exchange to yield CREY) does reduce costs on the conversion of REY to the calcined material CREY as shown schematically below:

(1) NaY+RE→REY into slurry→spray dry→RE exchange→CREY in catalyst
(2) NaY+RE→REY→calcination→RE exchange→RECREY→slurry→spray dry However, the further RE exchange of a spray dried and formed FCC catalyst particle containing REY does put a considerable amount of RE salts into the matrix.

As to the matrix materials, sodium salts such as Na aluminate and Na silicate are utilized for synthesis of the matrix which also contributes a high Na content. This can be reduced by using an acid ($H^+$) or alkaline ($NH_4^+$) wash, but a high sodium content within the matrix still remains and will require several repeated washings to reduce this to an acceptable level. Furthermore, the use of deionized water is useless since it also has a high Na content and thus requires using a demineralized water. If a clay is utilized as a part of or the sole matrix material, the clay also introduces some Na plus other alkaline metals such as K, Ca, Mg and the like. However, clay materials suitable for catalyst preparation normally contain these materials tightly bound to the extent that they do not re-exchange into the crystalline zeolite present. The methods of catalyst preparation of the prior art do not yield the optimum or an idealized RCC catalyst as particularly related to the catalyst hydrothermal stability, its metals tolerance and its activity-selectivity characteristics (zeolite and matrix acidity).

The catalyst preparation techniques of this invention are particularly directed to the elimination of a maximum amount of sodium from the special catalyst ingredients before they are slurried as herein provided and spray dried. The treatment of a NaY crystalline faujasite by the particular sequence comprising rare earth exchange of the zeolite with or without ammonia exchange before calcination and a further rare earth exchange maximizes Na removal from the crystalline zeolite without destroying its crystal structure. Rare earth (RE) inclusion by the above combination into the zeolite is however substantially increased and also provide the special zeolite compositions used in preparing catalysts by the technique of this invention and providing catalyst particles containing less than 0.3 wt % Na, and preferably below 0.25 wt % sodium.

The use of sodium reduced ingredients such as colloidal alumina, a low sodium silica hydrosol or sol, titania and zirconia and mixtures thereof helps to ensure that little sodium is contributed by the matrix material. When a special low sodium kaolin clay is utilized as herein defined, as part of the matrix material, the sodium present therein is quite low and is so tightly bound into the clay that it does not appear to migrate into a zeolite mixed therewith. However, even this tightly bound sodium can be partially removed by an acid treatment or by exchanging with $NH_4+$ or rare earth salts.

The catalyst compositions prepared by the techniques of this invention obtain sodium contributed primarily by the silica binder component and may be modified to some considerable extent with respect to pore size; matrix cracking activity and metals adsorbing capability. That is, it is contemplated increasing the pore size openings of the spray dried particles by incorporating, for example, carbon black or other suitable pore size contributing material in the slurry composition before spray drying thereof or in one or more wetted mixes of clay, silica hydrosol and/or colloidal materials prior to forming a slurry thereof with the select high lanthanum rich crystalline zeolite prepared as herein defined. On the other hand, the metals adsorbing capacity of the catalyst particle may be increased by incorporating yet another material in the catalyst composition and comprising one or more materials selected from the group consisting of zeolite A, mordenite, chabazite, a cheap naturally occurring faujasite material, a pillared clay material or combinations thereof. The addition of these metals absorbing and adsorbing materials is limited however to avoid undesired addition of sodium to the catalyst particle in conjunction with preparation of a less expensive catalyst without upsetting desired activity-selectivity characteristics thereof.

In yet another aspect, the primary catalyst composition components of this invention comprising a particularly prepared and select zeolite composition, matrix components of gel or colloid ancestrary and clay component, may be modified by the addition of one or more acidic promoters to the matrix material such as by adding nitrates, sulfates, phosphates, a halogen contributing material or an acidic silica containing component such as silica-alumina, silica-magnesia, silica-zirconia, silica-titania and others herein identified materials suitable for the purpose.

The catalyst preparation techniques of this invention also encompass some minor variations thereof as identified above with respect to additive materials for passivating accumulated metals in cooperation with the basic catalyst composition ingredients.

In this atmosphere of catalyst preparation novelty it is believed that the refiner is now able to vary composition of the catalyst particles more particularly as desired to obtain high activity catalyst particles and such flexibility because of ingredients utilized benefits considerably with respect to reduced costs to manufacture catalyst, reduces capital investment and more particularly permits adjustment of catalyst composition and activity essentially at will to optimize conversion of a given oil charge. Other advantages to this operating technique will be recognized by those skilled in the art particularly when a given reduced crude conversion operation requires variation in catalyst replacement due to attrition and changes in catalyst replacement rates as metals accumulation increases to equilibrium status to achieve particularly desired results requiring some changes in catalyst activity-selectivity characteristics. The benefits derived by using the catalyst and the catalyst preparation techniques of this invention are manifold: (1) Reduced crudes contain high vanadium (V) levels which upon deposition on the RCC catalyst in the riser cracking operation followed by catalyst regeneration yields $V_2O_5$. $V_2O_5$ melts (1275° F.) below RCC regeneration temperatures, flows through the catalyst destroying sieve and thus catalytic activity. The reaction of any sodium present with $V_2O_5$ yields sodium vanadate, a low melting solid (1240° F.). This low melting point of sodium vanadate is considered most undesirable since it is below normal RCC regeneration temperatures (1250° to 1500° F.). Thus providing low sodium containing catalyst particles to reduce forming either of these species capable of migration or flow as a liquid across and through catalyst particle and causing irreversible destruction of the zeolite crystalline structure to form an amorphous material is most desirable to prevent a substantial loss in catalyst activity and selectivity. In addition, this potential flow of vanadia causes matrix sintering, pore blockage and particle coalescence sufficient to cause defluidization in the operating environment.

To counteract the liquid migration effects of $V_2O_5$, immobilization agents such as Ti, Zr, In are added to the catalyst during or after preparation. A slurry mixture of the catalyst ingredients may be provided with one or more vanadia immobilization agents to form stable-high melting solids with deposited vanadia while encountering high temperatures in the regenerator, the formed high melting solids would include vanadium titanate, vanadium zirconate, vanadium indiate or other suitable complex materials all of which will melt above 1800° F. The presence of sodium however, will form high melting sodium derivative of Ti, Zr, In, such as Na titanate, Na zirconate, Na indiate and thus reduce the effectiveness of Ti, Zr, and In as V immobilization agents. (2) The presence of sodium in the catalyst particle will also permit it to migrate and react with and tie up acid cracking sites present in the zeolite and matrix material and thus reduce the activity-selectivity characteristics of the catalyst. This necessarily reduces the desired cracking activity of the catalyst matrix for the conversion of relatively large non-volatile hydrocarbon molecules present in reduced crude to provide smaller-volatile hydrocarbon molecules that can enter the zeolite pore structure for further cracking to gaseous and liquid fuels such as gasoline and heating fuels. By having little or substantially no mobile sodium present in the catalyst as prepared by the sequence and concepts of this invention and by operating an efficient desalter on the raw crude oil feed one can ensure that the effectiveness of vanadia immobilization additives are maximized and sodium deactivation is minimized. (3) By having little or no mobile sodium present in the matrix materials, obtained by acid treating and exchanging sodium out of any clay material utilized; a large number of acid sites can be provided and maintained in the catalyst matrix. One can also tolerate a somewhat higher sodium level in the feed, since the matrix can react with or immobilize sodium present in the feed, maintain matrix cracking activity for a longer on stream time period and ensure that very little, if any, sodium reaches the crystalline zeolite catalyst component and thus neutralize zeolite cracking activity. (4) The calcination of a (REY) rare earth exchanged "Y" zeolite followed by additional (RE) rare earth exchange after calcination ensures high sodium removal and provides the low sodium content special crystalline zeolite composition particularly desired. Furthermore, a better temperature control of zeolite calcination is possible and a better rare earth exchange environment is provided to obtain a lanthanum rich rare earth exchanged zeolite. Secondly, the rare earths are more easily exchanged into the crystalline zeolite to replace sodium and/or hydrogen as opposed to RE exchanging a final catalyst complex comprising a relatively small amount of rare earth (REY) containing catalyst particle composition. The rare earth exchanging of a spray dried REY containing catalyst particles puts some RE into the matrix without assuring maximum exchange with sodium in the zeolite component of the particle and this will neutralize some previously established acid sites in the matrix thus reducing the matrix cracking acidity, sodium neutralization level of the feed and lastly, this method of removing sodium from a catalyst particles requires substantially more rare earth solution to obtain (RE) rare earth in the crystalline zeolite component so as reduce its sodium and/or hydrogen level.

The catalyst preparation procedure of this invention is designed to considerably reduce some of the above undesired impediments and derogatory results associated with sodium and to particularly ensure obtaining a low sodium, high activity, if desired, matrix material in combination with the special crystalline zeolite composition which characteristics are considered particularly desirable and more appropriately utilized when coupled with the other desirable catalyst ingredient features particularly characterized or identified above.

Component materials utilized in the catalyst preparations of this invention include commercially available materials identified as follows:

(1) Hydrite UF kaolinite clay is identified as providing a medium micron particle size of about 0.20; a pH in the range of 4.2–5.2; a 325 mesh residue maximum percent of 0.20; and an oil adsorption value of 47. The wt % composition of the clay is as follows:

| Aluminum oxide | 38.38 | Calcium oxide   | 0.05 |
|----------------|-------|-----------------|------|
| Silicon oxide  | 45.30 | Magnesium oxide | 0.25 |
| Iron oxide     | 0.30  | Sodium oxide    | 0.27 |
| Titanium oxide | 1.44  | Potassium oxide | 0.04 |

(2) N-219 L carbon black (Ashland Chemicals) is a very fine particle sized, high surface area furnace black imparting high tensile strength to rubber compounds. Its properties are as follows:

| Particle Diameter, NM | 28 |
|---|---|
| ASTM Iodine No. | 115 |
| DBP Absorption, cc/gm | 0.78 |
| Reflectance Ratio | |
| Percent of IRB#3 | 90 |
| Percent Heat Loss | 0.7 |
| Percent Transmittance (Burgive) | 97 |
| Density, lb/ft$^3$ | 28 |
| gm/l. | 449 |

(3) A PQ Corp. "N" Brand (a sodium silicate) is identified as follows:

| Wt Ratio (SiO$_2$/Na$_2$O) | 3.22 |
|---|---|
| % Na$_2$O | 8.90 |
| % SiO$_2$ | 28.7 |
| Density °Be @ 68° F. | 41.0 |
| lb/gal | 11.6 |
| Viscosity Centipoise @ 68° F. | 180 cps. |

(4) Catapal SB alumina is identified as an ultra high purity alpha alumina monohydrate (Boehmite) prepared as a white spray dried powder. It is converted to gamma alumina by calcination at 900° F. for about 3 hours. A typical chemical analysis (wt %) is as follows:

| Al$_2$O$_3$ | 74.2 | Na$_2$O | .004 |
|---|---|---|---|
| SiO$_2$ | .008 | Sulfur | <.01 |
| Fe$_2$O$_3$ | .005 | | |

Particle size distribution is identified as:

48% <45 microns

12% >90 microns

The special catalyst compositions desired to be produced according to this invention may be prepared by more than one procedure. Some typical procedures are provided in the following examples:

EXAMPLE 1

RCCC-1 Special Preparation

A silica sol was prepared by adding 9.2 L of a sodium silicate (PQ Corp. "N" Brand) to 12 L of a 8 wt % H$_2$SO$_4$ solution. The addition was made continuously over a 30 minute period. The pH of the sol at this point was 2.0. A total of 10 kg of a kaolinite clay designated Hydrite UF was slurried in 8 L of 2.5 pH water with 30 gms. of sodium pyrophosphate and then added to the silica sol. The pH of the slurry after the kaolinite clay addition is 2.4. A total of 7 kg of a calcined Y (faujasite) zeolite having a silica to alumina molar ratio of at least 5 is slurried with 6 L of 3.0 pH water. The zeolite was previously exchanged before and after a 1050° F. calcination step with a rare earth mixture in which cerium oxide comprises less than 15 wt % of the total rare earth oxides. The exchange after calcination may also be conducted after the slurry is spray dried. Nevertheless, it is the intent to reduce the sodium content of the zeolite to 1.00 wt % or less with a rare earth mixture in which the lanthanum to cerium molar ratio is <3. The zeolite slurry is added to the clay-silica sol slurry to yield a slurry with a pH of 3.0 which was spray dried at an inlet temperature of 800° F. and outlet temperature of 300° F. The product was washed a total of three time with a large excess of 150° F. tap water for 30 minutes.

Next the catalyst was again rare earth exchanged 3 times with a solution containing 3–10% rare earths at a temperature of 150° F. for 30 minutes each. The solutions are separated from the catalyst and the particles are washed and dried at 350° F.

Three different catalyst compositions prepared following the procedure above identified and identified as RCCC-1 Special 1, 2 and 3 were analyzed and found to comprise the compositions identified in Table B below.

TABLE "B"

| COMPOSITION OF RCC CATALYSTS | | | |
|---|---|---|---|
| ELEMENTAL COMPOSITION WT % I.B. | RCCC-1 Sp. 1 | RCCC-1 Sp. 2 | RCCC-1 Sp. 3 |
| ZEOLITE | 40* | 41* | |
| CREY | 35 | 39 | 38 |
| $SiO_2$ | 68.6 | 65.8 | 70.3 |
| $Al_2O_3$ | 25.8 | 24.8 | 27.6 |
| $TiO_2$ | 1.18 | 1.04 | 1.16 |
| $Fe_2O_3$ | 0.49 | 0.18 | 0.21 |
| $Na_2O$ | 0.26 | 0.15 | 0.28 |
| $La_2O_3$ | 3.10 | 3.29 | 3.80 |
| $CeO_2$ | 2.30 | 2.06 | 1.60 |
| $Nd_2O_3$ | 1.11 | 1.18 | 1.36 |
| $Pr_6O_{11}$ | 0.39 | 0.41 | 0.50 |
| ($RE_2O_3$ total) | 6.90 | 6.94 | 7.26 |
| La/Ce | 1.35 | 1.60 | 2.38 |
| Total Pore Volume % cc/g | 0.37 | 0.37 | 0.28 |
| P.V. (500–2000 A) | 0.16 cc/g | 0.19 cc/g | 0.09 cc/g |
| % of Total P.V. (500–2000 A) | 43% | 51% | 33% |

EXAMPLE 2

Catalyst Preparation Procedure for Gel Catalyst 40% CREY, 10% Kaolinite Clay, 50% $SiO_2/Al_2O_3$ Gel (1) 2.37 kg of $Na_2SiO_3$ ("N" Brand from PQ Corp) and 12.7 L of tap $H_2O$ was added to a Kady mill and mixed 1 min.

(2) 600 g of 35% $H_2SO_4$ was added to resultant solution and mixed for 2 minutes before allowing to set for 1 hour at 100° F. with no stirring to obtain a pH of 11.

(3) An additional 60 g of 35% $H_2SO_4$ was added to the solution with stirring to gel the silica. After standing for 30 minutes at 100° F., pH =9.9

(4) 2 kg of alum [$Al(NH_4)(SO_4)_2$. 12 $H_2O$] in 8 L of tap $H_2O$ with 30 ml of conc. $H_2SO_4$ were added to gel slurry and mixed for 2 minutes. After standing for 15 minutes at 100° F. pH was 3.3

(5) This $SiO_2$-$Al_2O_3$ gel slurry was mixed for 3 minutes after adding 850 ml of conc. $NH_4OH$ to raise the pH to 6.4.

(6) 900 g of CREY and 230 g of Hydrite UF clay were added to the gel slurry and mixed for 22 minutes at 120° F. The resultant pH was 5.6 and the viscosity @ 120° F. was 880 cps.

(7) Spray dry the slurry obtained in (6) above at 400° C. inlet, 120° C. outlet temperature.

(8) Each kilogram of spray dried microspheres were washed 3 times with 4 L of deionized $H_2O$ at 150° F. before exchanging 3 times with 4 L of 2N rare earth chloride solution at 150° F. The filter cake was then washed 3 times with 4 L of deionized $H_2O$ before drying at 300° F. for 10 hours.

A catalyst prepared according to the procedure of Example 2 was characterized in part as follows:

TABLE "C"

| | Fresh | 1450° F., 5 hr. Steaming |
|---|---|---|
| Surface Area, $m^2/g$ | 453 | 292 |
| Zeolite Intensity | 16.4 | 8.2 |
| Relative Activity | | 699 |
| Na, wt % | 0.24 | |
| $SiO_2$, wt % | 74.6 | |
| Hg Pore Volume, cc/g | 0.34 | |

EXAMPLE 3

PREPARATION OF RCCC#4

1. To 11 L of 2 pH water made with $H_2SO_4$ was added 10 grams of $Na_4P_2O_7$ as a dispersant for the kaolinite clay. With vigorous mixing, 11 Kg of fine kaolinite clay was added to form a 50% solids slurry.

2. In a homogenizing mill, (Kady Mill) 12L of tap water were mixed with 960 grams of aluminum sulfate hydrate and 1.2L of $H_2SO_4$. Using a rate of 200 ml/min., 9 liters of "N" Brand sodium metasilicate was added to the acid solution while mixing. The aluminum was used to delay gelling of the resulting silica colloids. A final pH of 2 was also used to gain maximum delay of gelling time.

3. Ten grams of a dispersant called Marsperse CBO-3 and 800 grams of N-219L carbon black were added to the homogenizer and mixed for 5 minutes. Temperature was held below 110° F.

4. The clay slurry from step one was combined to the silica-carbon black slurry and mixed 5 minutes while maintaining temperature below 110° F.

5. A slurry of NaY zeolite made from 4 L of 2 pH $H_2O$ and 4 Kg of zeolite was quickly added to the Kady Mill and mixed 10 minutes. Temperature was held at 115° F.

6. This resulting slurry was spray dried at 400° C. inlet and 125° C. outlet temperatures in a Niro Atomizer Model V Drier. Air pressure was 30 psig.

7. One kilogram of the microspheres from the drier were washed three times with 4 L of 150° F. water and filtered.

8. The filter cake was exchanged twice with 3 L of 1.25 M $NH_4Cl$ for 15 minutes each at 150° F.

9. After filtering, the cake was then exchanged 3 times at 150° F. for 30 minutes with 3 liters of 0.33N mixed rare earth chloride solution.

10. Finally, the solids were washed 4 times with 3 L of 150° water, dried at 300° F. for 16 hours. This sample was oxidized in a shallow bed for 4 hours to produce the RCCC #4 sample.

11. A sample of RCCC #4 was further contacted by three additional exchanges of 100 gm with 1 L of a 0.5N solution of mixed rare earths chlorides at 150° F. for 30 minutes. The solid was washed 4 times with 500 ml of 150° F. water and dried for 16 hours at 300° F.

The catalyst prepared according to the procedure of Example #3 is characterized as follows in Table "D" and "E".

TABLE "D"

CATALYTIC PROPERTIES OF RCCC #4

| Catalyst Identification | Catalyst Without Carbon Black cc/g (%) | Catalyst With Carbon Black cc/g (%) | Change cc/g |
|---|---|---|---|
| Pore Size Distribution | | | |
| 6000–1000A | 0.039 (21) | 0.049 (20) | 0.010 |
| 1000–400 | 0.055 (29) | 0.071 (30) | 0.016 |
| 400–200 | 0.034 (16) | 0.044 (17) | 0.010 |
| 200–100 | 0.025 (12) | 0.040 (16) | 0.015 |
| 100–80 | 0.008 (4) | 0.012 (5) | 0.004 |
| 80–30 | 0.032 (17) | 0.033 (12) | 0.001 |
| Pore Volume cc/g | | | |
| $H_2O$ | 0.27 | 0.32 | 0.05 |
| Hg | 0.20 | 0.25 | 0.05 |
| Surface Area, $m^2/g$ | 203 | 198 | −5 |

TABLE "E"

COMPOSITION OF RCCC #4

| Component | Calculated | Found |
|---|---|---|
| 1. Zeolite | 22.8 | — |
| 2. Kaolinite | 55.5 | — |
| 3. Silica Binder | 21.4 | — |
| 4. Carbon Black | 4.5 | 4.5 |
| 5. $Al_2O_3$ (Bulk) | 29.9 | 29.6 |
| 6. $SiO_2$ (Bulk) | 63.6 | 63.2 |
| 7. $Na_2O$ | — | 0.33 |

A catalyst composition obtained by the procedure of Example 4 was tested and characterized according to the data of Table "F" and "G".

TABLE "F"

CATALYTIC PROPERTIES OF RCCC #4

| Catalyst | RCCC #4 |
|---|---|
| MAT Data, Vol %* | |
| Relative Activity | 175 |
| Conversion | 80 |
| CPF | 0.7 |
| HPF | 1.3 |
| MAT Data, Wt %* | |
| Conversion | 74 |
| Gasoline | 51.7 |
| Selectivity | 70.3 |
| Coke | 2.6 |
| Gas | 19.2 |

*After steaming at 1450° F., 5 hours, 97% steam

TABLE "G"

COMPARISON OF CATALYST PHYSICAL PROPERTIES

| Catalyst | RCCC #4 cc/g (%) |
|---|---|
| Pore Size Distribution | |
| 6000–1000A | 0.049 (20) |
| 1000–400 | 0.071 (30) |
| 400–200 | 0.044 (17) |
| 200–100 | 0.040 (16) |
| 100–80 | 0.012 (5) |
| 80–30 | 0.033 (12) |
| Pore Volume, cc/g | |
| $H_2O$ | 0.32 |
| Hg | 0.25 |
| Surface Area, $m^2/g$ | 198 |
| Initial Carbon Black, Wt % | 4.5 |

A catalyst composition of desired activity-selectivity characteristics which may be prepared following the concepts of preparation herein identified may be characterized as follows:

| | | |
|---|---|---|
| 1 | Zeolite Content | 40 wt % |
| | Zeolite $SiO_2/Al_2O_3$ (molar) | $\geq 5$ |
| | Zeolite La/Ce (molar) | $\geq 3$ |
| 2 | Total rare earths ($RE_2O_3$) | >7 wt % |
| 3 | Total $Na_2O$ | <0.3 wt % (pref. <.25 wt %) |
| 4 | Pore Volume ($H_2O$) | >0.40 cc/gm |
| 5 | ABD | 0.7 g/cc |
| 6 | Surface Area | |
| | (a) Total | >250 $m^2/g$ |
| | (b) Matrix | <20 $m^2/g$ |
| 7 | Particle Size Distribution | |
| | (a) 0–40 microns range | <10 wt % |
| | (b) APS | 65 microns |
| 8 | Hydrothermal Stability, MAT (1450° F., 5 hr., 100% $H_2O$) | 87 |
| 9 | Attrition Resistance | |
| | (a) DI | <10 |
| | (b) JI | <1.5 |

The catalyst composition above characterized, is particularly suitable for use in converting reduced crude hydrocarbon materials comprising carbo-metallic components boiling above about 1025° F. Other high boiling hydrocarbon feeds comprising residual oils, topped crudes, shale oil, oil product of coal liquefaction and oil products of tar sands may be upgraded to more desired product by conversion with the catalyst.

Having thus generally described the improved catalyst compositions of this invention and their method of preparation and specifically discussed examples in support thereof, it is to be understood that no undue restrictions are to be imposed by reasons thereof except as defined by the following claims:

We claim:

1. A composition of matter of fluidizable solid catalyst particles comprising in combination,
   (a) from 35 to 60 weight percent of a crystalline zeolite comprising a La/Ce ratio greater than 1/1 and a silica/alumina ratio of at least 4.5 dispersed in a matrix composition comprising clay particles of about 1 micron size and a refractory metal oxide of gelacious or colloid ancestrary,
   (b) the zeolite, clay, refractory metal oxide materials of step (a) each initially comprising less than 0.25 weight percent of sodium, and
   (c) a spray dried product of a mixture of step (a) providing fluidizable catalyst particles of a pore volume in the range of 0.35 cc/g up to about 0.8 cc/g.

2. The catalyst composition of claim 1 wherein the refractory metal oxide is selected from the group consisting of silica, alumina, silica-alumina, silica-magnesia, silica-alumina-magnesia, silica-titania, silica-zirconia, titania, zirconia and mixtures thereof.

3. The catalyst composition of claim 1 wherein the clay component is selected from the group consisting of kaolin, kaolinite, halloysite, montmorillonite, metakaolin and acid modified clays.

4. The catalyst composition of claim 1 wherein the zeolite is selected from the group consisting of mordenite, gmelinite, zeolite "L", ZSM4, faujasite and dealuminated faujasite.

5. The catalyst composition of claim 1 wherein the zeolite is a rare earth exchanged crystalline "Y" faujasite providing a silica to alumina ratio of at least 5/1.

6. The catalyst particle composition of claim 1 wherein the matrix is modified in acidity by including one or more materials selected from the group consisting of sulfonates, phosphates, a halogen contributing material, phosphoric acid, boric acid, acid activated clays, silica-alumina, silica-titania and silica-zirconia.

7. The catalyst composition of claim 1 in which the zeolite is dealumined faujasite to provide a silica to alumina ratio of at least 5.5/1 and said composition comprises one or more metals selected from the group consisting of Ti, Zr, and In.

8. The catalyst composition of claim 1 in which the lanthanum rich crystalline zeolite is of a particle size in the range of about 0.05 to 5 microns.

9. The spray dried catalyst composition of claim 1 in which at least 40% of its pore openings are greater than 500 Angstroms and at least 25% thereof are greater than 1000 Angstroms.

10. A catalyst particle composition comprising in combination;
   (a) at least 40 weight percent of a high activity crystalline aluminosilicate of large pore size dimensions such as provided by mordenite, zeolite "L", ZSM4, gmelinite and faujasite, ion exchanged sufficiently to provide a greater than 3/1 lanthanum to cerium ratio exchanged zeolite of less than 0.25 weight percent sodium,
   (b) said ion exchanged crystalline aluminosilicate admixed with a matrix composition comprising a clay material treated with an acidic modifier and a silica sol containing refractory material,
   (c) said matrix material of a composition providing a pore volume of at least about 0.40 cc/g, and
   (d) spray dried particles of the composition of (b) ion exchanged and dried to provide excess lanthanum in the particle composition.

11. The catalyst of claim 10 provided with one or more of Ti, Zr, Mq and Al.

12. A hydrocarbon conversion catalyst particle composition comprising in combination,
   (a) a crystalline faujasite rare earth exchanged zeolite providing a lanthanum to cerium ratio of at least 2/1 and a residual sodium level less than 0.22;
   (b) said crystalline zeolite dispersed in a kaolinite clay-refractory metal oxide matrix material providing catalyst particles with a pore volume of at least 0.4 cc/g and comprising substantial pore openings of at least 500 Angstroms, and
   (c) the composition of (b) rare earth exchanged after particle formation to reduce the residual sodium content of the catalyst particle.

* * * * *